(12) United States Patent
Horowitz et al.

(10) Patent No.: US 6,368,836 B2
(45) Date of Patent: *Apr. 9, 2002

(54) METHOD OF DECOLORIZING OR DEODORIZING POLYHYDROXYALKANOATES FROM BIOMASS WITH OZONE

(75) Inventors: Daniel M. Horowitz, Somerville, MA (US); Elaine M. Brennan, Astoria, NY (US)

(73) Assignee: Metabolix, Inc., Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,832

(22) Filed: Apr. 8, 1999

Related U.S. Application Data

(60) Provisional application No. 60/081,112, filed on Apr. 8, 1998.

(51) Int. Cl.⁷ .............. C12P 7/62; C12P 1/04
(52) U.S. Cl. .............. 435/135; 435/170
(58) Field of Search .............. 435/135, 170; 524/418; 523/500

(56) References Cited

U.S. PATENT DOCUMENTS

| | | | |
|---|---|---|---|
| 4,310,684 A | 1/1982 | Vanlautem et al. | 560/185 |
| 4,317,044 A | 2/1982 | Vaseen | 422/186.3 |
| 4,329,212 A | 5/1982 | Obenshain | 204/157.1 R |
| 4,331,603 A | 5/1982 | Harris | 549/228 |
| 4,517,084 A | 5/1985 | Pincon | 210/169 |
| 4,705,604 A | 11/1987 | Vanlautem et al. | 203/67 |
| 4,968,611 A | 11/1990 | Traussnig et al. | 435/135 |
| 5,110,980 A | 5/1992 | Ramsay et al. | 560/185 |
| 5,213,976 A | 5/1993 | Blauhut et al. | 435/135 |
| 5,245,023 A | 9/1993 | Peoples et al. | 536/23.2 |
| 5,431,861 A * | 7/1995 | Nagahiro et al. | 261/140.1 |
| 5,461,139 A | 10/1995 | Gonda et al. | 528/361 |
| 5,502,273 A | 3/1996 | Bright et al. | 800/205 |
| 5,525,658 A * | 6/1996 | Liddell et al. | 524/418 |
| 5,602,321 A | 2/1997 | John | 800/205 |
| 5,610,041 A | 3/1997 | Somerville et al. | 435/135 |
| 5,691,174 A | 11/1997 | Liddell et al. | 435/135 |
| 5,760,144 A * | 6/1998 | Ozeki et al. | 525/450 |
| 5,766,560 A * | 6/1998 | Cole | 422/186.18 |
| 5,821,299 A | 10/1998 | Noda | 524/725 |
| 5,855,856 A | 1/1999 | Karlson | 422/22 |
| 5,958,480 A * | 9/1999 | Eggink et al. | 426/90 |

FOREIGN PATENT DOCUMENTS

| | | | |
|---|---|---|---|
| DE | 4215861 | * | 11/1993 |
| DE | 4215864 | * | 11/1993 |
| DE | 276304 | * | 7/1995 |
| EP | 0 145 233 A2 | | 6/1985 |
| JP | 07079788 | * | 3/1993 |
| JP | 07177894 | * | 7/1995 |
| WO | WO 91/00917 A1 | | 1/1991 |
| WO | WO 92/19747 A1 | | 11/1992 |
| WO | WO 93/02187 A1 | | 2/1993 |
| WO | WO 93/02194 A1 | | 2/1993 |
| WO | WO 93/11656 A1 | | 6/1993 |
| WO | WO 94/02541 A1 | | 2/1994 |
| WO | WO 94/12014 A1 | | 6/1994 |
| WO | WO 96/06179 A1 | | 2/1996 |
| WO | WO 96/17369 A1 | | 6/1996 |
| WO | WO 97/07229 A1 | | 2/1997 |
| WO | WO 97/07239 A1 | | 2/1997 |
| WO | WO 97/15681 A1 | | 5/1997 |

OTHER PUBLICATIONS

Nawrath & Poirier, "Review on Polyhydroxyalkanoate Formation in the Model Plant *Arabidopsis thaliana*," *The International Symposium on Bacterial Polyhydroxyalkanoates*, (Eggink, et al., eds.) pp. 119–126, Davos, Switzerland (1996).

Poirier, et al., "Polyhydroxybutyrate, a Biodegradable Thermoplastic, Produced in Transgenic Plants," *Science* 256:520–523 (1992).

Van Der Leij & Witholt, "Strategies for the sustainable production of new biodegradable polyesters in plants: a review," *Can. J. Microbiol.* 41(supp. 1):222–38 (1995).

Williams & Peoples, "Biodegradable plastics from plants," *Chemtech* 26:38–44 (1996).

* cited by examiner

*Primary Examiner*—David M. Naff
*Assistant Examiner*—Mike Meller
(74) *Attorney, Agent, or Firm*—Holland & Knight LLP

(57) ABSTRACT

Methods for the recovery and cation of polyhydroxyalkanoates (PHAs) from biomass containing PHAs, wherein the methods include treating the biomass or partially purified PHA with ozone, in at least one step of a purification process, have been developed. Treatment of PHA-containing biomass or partially purified PHA with ozone yields an enhanced level of purity suitable for coating and other applications. The ozone treatment also has the added advantage that be resulting PHA polymer or polymer latex is essentially odor-free. The ozone treatment may be used alone or in combination with other treatment, extraction, and separation stages, and is especially suitable for the treatment of PHA-containing latexes slurries, suspensions, and organic solutions.

12 Claims, No Drawings

METHOD OF DECOLORIZING OR DEODORIZING POLYHYDROXYALKANOATES FROM BIOMASS WITH OZONE

CROSS-REFERENCE TO RELATED APPLICATIONS

Priority is claimed to U.S. provisional application Serial No. 60/081,112, filed Apr. 8, 1998.

BACKGROUND OF THE INVENTION

The present invention is generally in the field of separation processes for polymers, and more specifically to purification of polymers derived from biological sources.

Polyhydroxyalkanoates (PHAs) are thermoplastic polyesters which can be produced from bacteria or plants (Williams & Peoples, *CHEMTECH* 26:33–44 (1996)). These polymers can be recovered from the biological systems (the biomass) by organic solvent processes, aqueous processes, or a combination of both organic solvent/aqueous processing. Examples of known organic solvent recovery processes are described in U.S. Pat. No. 4,310,684 and No. 4,705,604 to Vanlautem et al. (extraction of PHB from microbes with chlorinated solvents); U.S. Pat. No. 4,968,611 to Traussnig et al. (use of diols, acetalized triols, di- or tricarboxylic acid esters or butyrolactone to extract poly-3-hydroxybutyrate (PHB) and its copolymers from microbes); U.S. Pat. No. 5,213,976 to Blauhut et al. (process for extracting PHB from microbial cells using methylene chloride followed by precipitation of the PHB in water); PCT WO 97/15681; PCT WO 93/11656 (use of acetone to extract poly-3-hydroxyoctanoate polymer from *Pseudomonas oleovorans*); PCT WO 96/06179 and PCT WO 97/15681 (solvent methods for recovering PHAs from transgenic plant crops); and U.S. Pat. No. 5,821,299 to Noda (the use of solvent/partial non-solvent mixtures for extracting PHAs from biomass). Typically, in each of these prior art processes, some of the biomass components are co-extracted with the PHA, which can cause the PHA product to be discolored and/or to have an unpleasant odor.

In some cases, it is useful to extract the PHAs from biomass using aqueous processing techniques, in which the polymer remains in a microparticulate state and the non-PHA biomass is solubilized through mechanical, chemical, and/or enzymatic treatments. The PHA particles then are separated from the solubilized material using centrifugation, filtration, flotation, or other known methods.

EP 0 145 233, for example, discloses aqueous methods for purifying a microbiological 3-hydroxybutyrate polymer wherein the cells are heat-treated at temperatures above 80° C. and then digested with enzymes, surfactants, and/or hydrogen peroxide. U.S. Pat. No. 5,110,980 to Ramsey et al. describes the use of hypochlorite for dissolving non-PHA biomass. U.S. Pat. No. 5,691,174 to Liddell et al. discloses a method for purifying microbial polyesters using the combination of hydrogen peroxide with a chelating agent. The disadvantage of these methods, however, is that the peroxide treatment must be carried out at high temperatures, e.g., 80–180° C., which requires extensive heating and cooling of the product and, in some cases, requires high pressure equipment. Furthermore, the hydrogen peroxide frequently is found to be unstable in the presence of high levels of cellular biomass, which results in the hydrogen peroxide decomposing nonproductively to water and oxygen and generating voluminous foam. Another drawback is that the prolonged high temperatures and hydrogen peroxide also can cause a decrease in the molecular weight of the polymers, and in some cases can promote crystallization of the polymers, which is undesirable for the production of an amorphous polymer latex.

As discussed above, PHAs derived from biomass can have unpleasant odors. PCT WO 94/02541 describes additives to mask odor arising from the PHAs produced, for example, as described in EP 0 145 233 and U.S. Pat. No. 5,691,174 to Liddell et al. It would be advantageous to eliminate the odor associated with PHAs recovered from biomass, particularly if odor removal could be performed during the recovery process, thereby eliminating the need for odor-masking additives in the PHA resin.

It is therefore an object of the present invention to provide improved methods of purifying polyhydroxyalkanoates derived from biomass.

It is a further object of the present invention to enhance extraction of polyhydroxyalkanoates from biomass containing polyhydroxyalkanoates using organic solvent systems, aqueous solvent systems, or combinations thereof It is another object of the present invention to provide extraction methods which reduce the exposure of the PHA polymers to conditions which can decrease the molecular weight of the polymers.

It is a further object of the present invention to eliminate odors in the process of recovering polyhydroxyalkanoates from biomass.

SUMMARY OF THE INVENTION

Methods are provided for the recovery and purification of polyhydroxyalkanoates (PHAs) from PHA-containing plant and microbial biomass, wherein the methods include contacting the biomass or partially purified PHA with ozone in at least one step of a purification process. Ozone has the beneficial effects of (a) bleaching, (b) deodorization, and (c) solubilization of impurities, facilitating their removal from aqueous polymer suspensions or latexes. The ozone treatment may be used alone or in combination with other treatment, extraction, and separation processes, and is especially suitable for the treatment of PHA-containing latexes, slurries, suspensions, and organic solvent solutions. The ozone contacting step advantageously can be conducted over a wide range of temperatures, including processing temperatures, for example between about 1 and 40° C., which are lower than processing temperatures used in known methods. Treatment with ozone of PHA-containing biomass, partially purified PHA, or solvent-extracted PHA yields an enhanced level of polymer purity suitable for coating and other applications. The ozone treatment also has the added advantage that the resulting PHA polymer or polymer latex is essentially odor-free.

DETAILED DESCRIPTION OF THE INVENTION

Improved methods for the recovery of polyhydroxyalkanoates (PHAs) from biomass including PHAs have been developed. The methods include treating the biomass or partially purified PHA with ozone, in at least one step of a purification process. Ozone treatment can be beneficially applied to PHAs from any source, including PHAs extracted using organic solvents (e.g., by treating an organic solvent solution of the PHAs), in order to further purify and/or deodorize the PHAs.

Polyhydroxyalkanoates

PHAs can be produced in a number of biological systems including bacteria and genetically engineered plant crops. In bacterial systems, the PHAs are accumulated intracellularly as granular inclusion bodies. PHA also can be produced in genetically engineered plant crops. Methods for constructing such crops are described, for example, in U.S. Pat. Nos. 5,245,023 and 5,250,430 to Peoples and Sinskey; U.S. Pat. No. 5,502,273 to Bright et al.; U.S. Pat. No. 5,534,432 to Peoples and Sinskey; U.S. Pat. No. 5,602,321 to John; U.S. Pat. No. 5,610,041 to Somerville et al.; PCT WO 91/00917; PCT WO 92/19747; PCT WO 93/02187; PCT WO 93/02194; PCT WO 94/12014, Poirier et al., *Science* 256:520–23 (1992); van der Leij & Witholt, *Can. J. Microbiol.* 41(supp.):222–38 (1995); Nawrath & Poirier, *The International Symposium on Bacterial Polyhydroxyalkanoates*, (Eiggink et al., eds.) Davos Switzerland (Aug. 18–23, 1996); and Williams & Peoples, *CHEMTECH* 26: 38–44 (1996). Methods for recovering PHAs from plant biomass are described, for example in PCT WO 97/15681, PCT WO 97/07239, and PCT WO 97/07229.

The PHA-containing biomass derived from bacteria or plants which is to be used in the methods described herein typically is in the form of a polymer slurry, latex, or solution. The polymer slurry, latex, or solution preferably has a solids content between about 1 and 90% by weight, and more preferably between about 5 and 50% by weight.

The ozone purification methods described herein similarly are useful for purification of other PHAs, regardless of source organism or comonomer composition. Representative PHAs include poly-3-hydroxybutyrate (PHB), poly-3-hydroxybutyrate-co-3-hydroxyvalerate (PHBV, marketed as BIOPOL™ by Monsanto), poly-3-hydroxybutyrate-co-4-hydroxybutyratepoly-3-hydroxypropionate, poly-3-hydroxybutyrate-co-3-hydroxypropionate, poly-4-hydroxybutyrate, poly-3-hydroxybutyrate-co-3-hydroxyhexanoate, poly-3-hydroxybutyrate-co-3-hydroxyoctanoate, poly-5-hydroxyvalerate, and poly-6-hydroxyhexanoate.

Ozone

Ozone ($O_3$), also referred to as "activated oxygen", is an allotropic form of oxygen, and is one of the strongest known oxidants. It may be generated by any convenient method, such as corona discharge or UV irradiation, applied to an air, oxygen, or oxygen-enriched air stream, as described for example in U.S. Pat. No. 5,855,856 to Karlson and No. 5,766,560 to Cole (corona discharge) and in U.S. Pat. No. 4,517,084 to Pincon, U.S. Pat. No. 4,329,212, No. 4,427,636 to Obenshain, No. 4,317,044 to Vaseen (UV irradiation).

Preferably, ozone is applied to the PHA-containing biomass or solution in an oxygen ($O_2$) stream containing between about 1 and 10%, and more preferably between about 2 and 5%, ozone.

Ozone advantageously is active at ambient temperatures and can be generated economically in situ from air or oxygen. The ozone preferably is generated at the PHA extraction site.

PHA Purification Methods Using Ozone

In a preferred embodiment, the PHA-containing biomass (of microbial, plant, or other origin) is treated with ozone for purposes of bleaching, sterilization, solubilization/oxidation of impurities, and/or deodorization. The ozone-containing gas stream may be introduced in the polymer-containing fluid phase by sparging, nozzle-injection, or other means selected to provide efficient mass transfer of the ozone.

The treatment with ozone is effective at any stage of a PHA isolation process for PHAs, which may comprise one or more treatment and/or separation steps. In an aqueous process, ozone may be used individually or in combination with other operations such as thermal treatment, enzyme treatment (e.g., nuclease, protease, or glycosidase), mechanical treatment (e.g., homogenizer or Microfluidizer), chemical treatment (e.g., surfactant, hypochlorite, or peroxide), centrifugation, filtration, and/or flotation. Ozone has a strong bleaching and deodorizing effect at any point of such a treatment process; however, for maximum efficacy, it may be desirable for the ozone treatment to be effected subsequent to lysis and partial removal of the non-PHA biomass.

Ozone treatment has a strong whitening and deodorization effect when applied at any of various stages of a PHA isolation process. For example, the ozone can be applied (a) to a whole cell aqueous slurry, (b) to a crude polymer aqueous slurry following homogenization, lysozyme/protease treatment, and washing, (c) to a crude polymer aqueous slurry following homogenization, lysozyme/protease treatment, washing, hydrogen peroxide bleaching, and washing, and (d) to an organic solvent solution containing PHA generated, for example, using a process described in U.S. Pat. No. 4,310,684 and No. 4,705,604 to Vanlautem et al.; U.S. Pat. No. 4,968,611 to Traussnig et al; U.S. Pat. No. 5,213,976 to Blauhut et al.; U.S. Pat. No. 5,821,299 to Noda; PCT WO 93/11656; PCT WO 96/06179; or PCT WO 97/15681. Following ozone treatment, the polymer containing slurry can be purified by microfiltration with water washing. The ozone effects significant solubilization of non-PHA material, as evidenced by a decrease in ash content. (PHA polymers volatilize cleanly at approximately 300° C., whereas other cellular contents, such as DNA and protein, produce ash near this temperature).

Ozone treatment can be performed in the presence of various functional additives useful for the stabilization and/or purification of PHA latexes and slurries. Examples of these additives include surfactants, detergents, emulsifiers, dispersants, anti- or de-foaming agents, pH control agents, and chelators. For aqueous polymer suspensions, the pH of the suspension generally is not vital for successful ozone treatment. Nonetheless, a pH approximately neutral is desirable to maintain a stable polymer suspension and/or to precipitation of soluble impurities.

Foam formation may be a side effect of ozone treatment, due to the introduction of a largely insoluble gas stream into the polymer suspension. Since foaming can be disadvantageous for the production of stable, uniform latexes, it typically is necessary to add emulsifiers/dispersants and antifoaming agents immediately prior to ozone treatment. Preferably, the ozone is applied in as concentrated a form as practical (e.g., a stream of having greater than 1% $O_3$ in oxygen/air), in order to minimize foam formation from the inert carrier gas.

In a preferred embodiment, ozone treatment is applied in combination with hydrogen peroxide bleaching of PHA-containing biomass. Without being bound by the theory, it appears that ozone preferentially targets impurities containing unsaturated and/or aromatic rings, whereas hydrogen peroxide reacts via a peroxyl anion with electrophilic species. The effect is to render the impurities more highly water soluble (and hence easier to separate from the polymer suspensions by filtration or centrifugation) and less highly colored or odoriferous. Additionally, ozone, when applied prior to a peroxide-based treatment of the polymer suspension, usefully prolongs the lifetime of the peroxide in solution and increases the efficacy of the peroxide treatment.

The quantity of ozone to utilize depends on the desired effect upon the final product, as well as the form of the PHA-containing biomass which is treated. For example, a water-based slurry, suspension, or latex may require a relatively high dose of ozone for essentially complete decoloration, for example, between about 0.02 and 0.1 g ozone per gram of PHA-containing biomass. A relatively pure homogeneous solution of PHA in an organic solvent, however, may be treated to reduce odor and color with a more modest dose, for example between about 0.002 and 0.01 g ozone per gram of solute.

Applications Using the Purified PHAs

Improving PHA recovery and purification methods is highly advantageous, as PHAs can be processed for use in an enormous variety of applications. It is evident that ozone may be especially useful for those applications where high purity, sterility, low odor, or low ash residue are important. In some cases, the purified latex or slurry will itself be useful as a product, while in other cases it may be advantageous to isolate the ozonated polymer in dry form for shaping and processing.

Slurries or latexes of PHA treated with ozone may be useful for any of the various applications for which PHAs are proposed, such as biodegradable objects; food coatings and additives; cathode-ray tube (CRT) lacquers; ceramic and powdered metal binders; biomedical microspheres, implants, and devices; and melt processed articles, such as described in U.S. Pat. No. 5,525,658 to Liddell et al.

A particularly suitable application for ozone-treated PHA latex is as a CRT lacquer. The lacquer is used to form a smooth substrate over the surface of the CRT phosphor particles allowing the subsequent deposition of a reflective aluminum layer, followed by thermal volatilization of the polymer substrate (PCT WO 96/17369). This application relies upon the ability of pure PHAs to decompose thermally and volatilize at temperatures of approximately 300° C. A high level of purification is necessary to use PHA latexes in this application, as cellular residues such as protein and nucleic acid may leave a charred residue on the CRT panel after baking out, resulting in poor picture quality. The usefulness of a PHA latex for application as a CRT lacquer may be judged in part from an ash analysis conducted at 450° C. in air atmosphere, conditions which approximate those used in CRT metallization. Ozone-treated latexes, and especially those treated with the combination of ozone followed by hydrogen peroxide, have exceptionally low ash contents upon baking out and are well suited to CRT lacquer use.

The compositions and methods of preparation and use thereof described herein are further described by the following non-limiting examples.

EXAMPLE 1

Production of PHA in *Pseudomonas putida*

Cells of *Pseudomonas putida* were fermented to a density of 76 g/L by growth on octanoic acid in minimal mineral salts medium. Under these conditions, the cells typically accumulate between 30 and 60% PHA on a cell dry weight basis, with R-3-hydroxyoctanoic acid as the principal comonomer. The sample, consisting of 48 L, was washed by constant volume diafiltration with deionized water, using a ceramic cross-flow microfiltration apparatus (Niro Inc.). Commercial nuclease then was added (BENZONASE™, available from American International Chemical, 10 μL/L of cells), the pH was adjusted to 10 with ammonia, and the cells were disrupted by twice passing the sample through a Microfluidizer M-110EH (Microfluidics International Corp.) at an operating pressure of 15,000 psi. The lysate was digested with (a) chicken egg lysozyme (Sigma Chemical Co., 0.2 g/L, pH 7.0, 45° C., 1 hr, 20 mM EDTA added); (b) ALCALASE™ (Novo Nordisk, 1 mL/L, pH 7.5, 50° C., 2 hr); and (c) FLAVOURZYME™ (Novo Nordisk, 1 g/L, pH 7.2, 50° C., 8 hr). ALCALASE™ and FLAVOUIRZYME™ digestions were conducted in the presence of 0.5% BRIJ™ 721 (ICI Surfactants). Following FLAVOURZYME™ treatment, the PHA sample was washed by constant volume diafiltration with water containing 0.25% BRIJ™ 721 and then concentrated to a volume of 16 L.

EXAMPLE 2

Ozone Treatment of PHA Crude Latex

Half of the PHA crude latex from Example 1 (8 L) was diluted 1:1 with deionized water. Then, BRIJ™ 721 was added to 0.5% wt/vol, and the latex was sparged with an ozone-containing oxygen stream (4 standard cubic feet per hour, 3–4% ozone) for 8 hr at room temperature, pH 7, with vigorous agitation. Following ozonation, the latex was washed to remove solubilized impurities by constant volume diafiltration with water containing 0.25% BRIJ™ 721.

The washed latex was then further treated with hydrogen peroxide, 3% wt/vol, at 80° C., with the addition of 0.5% BRIJ™ 721 and 0.01% DTPA (diethylenetriamine pentaacetic acid), until essentially all peroxide was exhausted (15 hr). The product was washed to remove solubilized impurities by constant volume diafiltration with water containing 0.25% BRIJ™ 721. The final product from washing contained 0.8% ash (wt/wt of solids basis) following polymer decomposition at 450° C. in air.

EXAMPLE 3

Peroxide Treatment without Ozonation

Half of the PHA crude latex from Example 1 (8 L) was diluted 1:1 with deionized water. BRIJ™ 721 (0.5%) and DTPA (0.01%) were added, and the latex was then treated with hydrogen peroxide, 3% wt/vol, at 80° C., until essentially all peroxide was exhausted (7 hr). The product was washed to remove solubilized impurities by constant volume diafiltration with water containing 0.25% BRIJ™ 721. The final product from washing contained 4.6% ash (wt/wt of solids basis) following polymer decomposition at 450° C. in air.

EXAMPLE 4

Ozone Treatment Following Peroxide Treatment

The product derived as in Example 3 was sparged with an ozone-containing oxygen stream (4 standard cubic feet per hour, 3–4% ozone) for 8 hr at room temperature, pH 7, with vigorous agitation. Following ozonation, the latex was washed to remove solubilized impurities by constant volume diafiltration with water containing 0.25% BRIJ™ 721. The final product from washing contained 0.9% ash (wt/wt of solids basis) following polymer decomposition at 450° C. in air.

EXAMPLE 5

Preparation of PEA Latex with Low Ash Content

Cells of *Pseudomonas putida* were fermented to density of 80 g/L by growth on octanoic acid in minimal mineral salts medium. The sample, consisting of 46 L, was washed by constant volume diafiltration with deionized water and concentrated to a volume of 20 L. Commercial nuclease then was added (BENZONASE™, 10 μL/L of cells), the pH was adjusted to 10 with ammonia, and the cells were disrupted by twice passing the sample through a Microfluidizer M-110EH (Microfluidics International Corp.) at an operating pressure of 15,000 psi. The lysate was digested with chicken egg lysozyme (0.2 g/L, pH 7.0, 45° C., 1 hr, 20 mM EDTA added), followed by ALCALASE™ (1 mL/L, pH 7.5, 50° C., 10 hr, 0.3% BRIJ™ 721 added). Following ALCALASE™ treatment, the sample was washed by constant volume diafiltration with water containing 0.1% BRIJ™ 721.

BRIJ™ 721 was added to 0.2% wt/vol, and then the latex was sparged with an ozone-containing oxygen stream (4 standard cubic feet per hour, 3–4% ozone) for 10 hr at room temperature, pH 7, with vigorous agitation. Following ozonation, the latex was washed to remove solubilized impurities by constant volume diafiltration with water containing 0.1% BRIJ™ 721.

The washed latex was then further treated with hydrogen peroxide, 3% wt/vol, at 80° C., with the addition of 0.15% BRIJ™ 721 and 0.01% DTPA, until essentially all peroxide was exhausted (18 hr). The product was washed to remove solubilized impurities by constant volume diafiltration with water containing 0.1% BRIJ™ 721 (9 vol.) followed by water (2 vol.), and then concentrated to a solids content of 10.7%. The final product contained 0.05% ash (wt/wt of solids basis) following polymer decomposition at 450° C. in air.

EXAMPLE 6

Determination of Ash for PHA-Containing Samples

Dry samples (0.2–1.0 g) were heated in air to 450° C. at a rate of 10° C./min, in quartz or aluminum vessels. The furnace temperature was maintained at 450° C. for a period of 45 min, after which the samples were allowed to cool and the unvolatilized residue weighed. Liquid samples containing water (solids content 0.2–1.0 g) were heated in air to 150° C. at a rate of 10° C./min, and then maintained at 150° C. for 30 min to evaporate the water. The temperature then was increased to 450° C. at a rate of 10° C./min, and maintained at 450° C. for a period of 45 min. The samples then were allowed to cool. The unvolatilized residue measured and reported as a percentage of the weight of solids present in the original sample.

EXAMPLE 7

Ozone Treatment of an Organic Solution of PHA

Cells of *P. putida* fermented, as described above, on octanoic acid were collected by centrifugation and freeze-dried to give a solid mass. The mass (440 g) was pulverized in a mill and placed in the thimble of a Soxhlet extractor. The dried cells were extracted in two batches for a total of 16 hr with n-hexane (2 L), yielding an amber extract ($A_{273}$=0.457, 1:9 dilution in hexane) which contained 26% (wt/vol) solids. The extract was clarified by pressure filtration through a 2 $\mu$m glass microfiber filter. The extract (26% wt/vol solids) then was sparged with an ozone-containing oxygen gas stream (8 standard cubic feet per hour, ca. 2% ozone) for 15 min at room temperature with agitation. The resulting product was a clear, virtually colorless liquid ($A_{273}$=0.152, 1:9 dilution in hexane). A portion of ozonated extract (0.6 L) then was passed through a column of silica gel (ca. 60 g), and the colorless eluate (26% wt/vol solids) was collected ($A_{273}$=0.063, 1:9 dilution in hexane).

EXAMPLE 8

Purification of PHAs Dissolved in Dichloromethane

Solutions of poly-3-hydroxybutyrate (PHB) (Fluka) and poly-3-hydroxybutyrate-co-14%-3-hydroxyvalerate (PHBV) (Aldrich) were prepared at 5% (wt/vol) in dichloromethane. The solutions were clarified by pressure filtration through a 2.6 $\mu$m glass microfiber filter. Each solution (95 mL) was then sparged with an ozone-containing oxygen gas stream (8 standard cubic feet per hour, ca. 2% ozone) for 6 min at room temperature with agitation. The products were clear, virtually colorless solutions. The PHB solution after ozonation showed an $A_{273}$=0.714 (1:9 dilution in dichloromethane) compared to $A_{273}$=0.904 (1:9 dilution in dichloromethane) prior to ozonation. Similarly, the PHBV solution after ozonation showed an $A_{273}$=0.599 (1:9 dilution in dichloromethane) compared to $A_{273}$=1.029 (1:9 dilution in dichloromethane) prior to ozonation.

Modifications and variations of the present invention will be obvious to those of skill in the art from the foregoing detailed description. Such modifications and variations are intended to come within the scope of the following claims.

We claim:

1. A method for purifying polyhydroxyalkanoates (PHAs) derived from biomass comprising PHA, the method comprising contacting a PHA-suspension, slurry or latex with an effective amount of ozone to decolorize or deodorize the PHA suspension, slurry or latex, wherein the PHA comprises a monomer component of a polymer selected from the group consisting of poly-3-hydroxybutyrate, poly-3-hydroxypropionate, poly-3-hydroxybutyrate-co-3-hydroxyvalerate, poly-3-hydroxybutyrate-co-3-hydroxyhexanoate, poly-3-hydroxybutyrate-co-3-hydroxyoctanoate, poly-3-hydroxybutyrate-co-4-hydroxybutyrate, poly-3-hydroxybutyrate-co-4-hydroxybutyrate, poly-3-hydroxybutyrate-co-3-hydroxypropionate, poly4-hydroxybutyrate, poly-5-hydroxyvalerate, and poly-6-hydroxyhexanoate.

2. The method of claim 1 wherein the ozone is provided as an ozone-containing gas or liquid.

3. The method of claim 1 wherein the PHA suspension, slurry or latex is obtained from a biomass derived from a microbial or plant source.

4. The method of claim 1 wherein the PHA is selected from the group consisting of poly-3-hydroxybutyrate, poly-3-hydroxypropionate, poly-3-hydroxybutyrate-co-3-hydroxyvalerate, poly-3-hydroxybutyrate-co-3-hydroxyhexanoate, poly-3-hydroxybutyrate-co-3-hydroxyoctanoate, poly-3-hydroxybutyrate-co-4-hydroxybutyrate, poly-3-hydroxybutyrate-co-4hydroxybutyrate, poly-3-hydroxybutyrate-co-3-hydroxypropionate, poly-4-hydroxybutyrate, poly-5-hydroxyvalerate, and poly-6-hydroxyhexanoate.

5. The method of claim 1 wherein the PHA is provided in the suspension, slurry or latex in water.

6. The method of claim 5 wherein the concentration of PHA in the suspension, slurry or latex is between about 1% and about 50% wt/vol.

7. The method of claim 1 wherein the PHA is provided in the suspension, slurry or latex in an organic solution.

8. The method of claim 1 wherein the ozone contacting step is conducted at a temperature between about 1 and 40° C.

9. The method of claim 1 wherein the ozone contacting step is conducted in the presence of at least one functional additive selected from the group consisting of surfactants, detergents, emulsifiers, dispersants, anti-foaming agents, defoaming agents, biocides, viscosity modifiers, and pH control agents.

10. The method of claim 3 wherein the biomass is treated using at least one treatment selected from the group consisting of thermal treatment, homogenization, microfluidization, protease treatment, glycosidase treatment, treatment with hydrogen peroxide or another inorganic or organic peroxide, solvent extraction, centrifugation, filtration, and dialysis.

11. The method of claim 10 wherein the treatment is conducted prior to or subsequent to contacting the PHA suspension, slurry or latex with ozone.

12. The method of claim 3 wherein the ozone is also sparged into the biomass.

* * * * *

UNITED STATES PATENT AND TRADEMARK OFFICE
CERTIFICATE OF CORRECTION

PATENT NO. : 6,368,836 B2
DATED : April 9, 2002
INVENTOR(S) : Daniel M. Horowitz and Elaine M. Brennan It is certified that error appears in the above-identified patent and that said Letters Patent is hereby corrected as shown below:

<u>Column 8,</u>
Lines 13-14, delete "poly-3-hydroxybutyrate-co-4-hydroxybutyrate".
Lines 7-8, delete "poly-3-hydroxybutyrate-co-4-hydroxybutyrate".

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,368,836 B2
APPLICATION NO. : 09/288832
DATED : April 9, 2002
INVENTOR(S) : Daniel M. Horowitz and Elaine M. Brennan It is certified that error appears in the above-identified patent and that said Letters Patent is hereby corrected as shown below:

Claim 1, column 8, lines 18 and 19, delete the second occurrence of "poly-3-hydroxybutyrate-co-4-hydroxybutyrate".
Claim 4, column 8, lines 33 and 34, delete the second occurrence of "poly-3-hydroxybutyrate-co-4-hydroxybutyrate".

Signed and Sealed this

Seventeenth Day of November, 2009

David J. Kappos
*Director of the United States Patent and Trademark Office*